(12) United States Patent
Li et al.

(10) Patent No.: US 12,736,825 B2
(45) Date of Patent: Sep. 15, 2026

(54) OPTICAL SYSTEM AND DISPLAY APPARATUS

(71) Applicant: Beijing Zitiao Network Technology Co., Ltd., Beijing (CN)

(72) Inventors: Xin Li, Beijing (CN); Ling Fu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 209 days.

(21) Appl. No.: 18/798,309

(22) Filed: Aug. 8, 2024

(65) Prior Publication Data

US 2025/0053020 A1 Feb. 13, 2025

(30) Foreign Application Priority Data

Aug. 8, 2023 (CN) ........................ 202310996286.2

(51) Int. Cl.
*G02B 27/09* (2006.01)
*G02B 1/08* (2006.01)
*G02B 27/28* (2006.01)

(52) U.S. Cl.
CPC ........... *G02B 27/0961* (2013.01); *G02B 1/08* (2013.01); *G02B 27/286* (2013.01); *G02B 27/288* (2013.01)

(58) Field of Classification Search
CPC .............. G02B 27/0961; G02B 27/286; G02B 27/288; G02B 27/0172; G02B 27/0101; G02B 1/08; G02B 1/10; G02B 5/30; G02B 13/00; G02B 13/002; G02B 13/006; G02B 13/06; G02B 13/18
USPC .......................................................... 359/619
See application file for complete search history.

(56) References Cited

U.S. PATENT DOCUMENTS 5,715,023 A * 2/1998 Hoppe .............. G02B 27/0172 349/11
11,112,562 B2 * 9/2021 Tohara ................ G02B 6/0065
11,536,968 B2 * 12/2022 Tohara ................ G02B 27/283
11,977,228 B2 * 5/2024 Taketani ............. G02B 27/283
12,013,535 B2 * 6/2024 Tohara .................. G02B 13/18
12,345,872 B2 * 7/2025 Yun ................... G02B 27/0025
12,523,875 B2 * 1/2026 Iba .......................... G02B 3/04
(Continued)

FOREIGN PATENT DOCUMENTS

CN 110196492 A 9/2019
CN 212111977 U 12/2020
(Continued)

OTHER PUBLICATIONS

Office action received from Chinese patent application No. 202310996286.2 mailed on Sep. 15, 2025, 15 pages (7 pages English Translation and 8 pages Original Copy).

*Primary Examiner* — William R Alexander

(57) ABSTRACT

An optical system and a display apparatus are provided. The optical system includes: a lens component, a transflective film, a reflective polarization layer, and a phase retardation film. The lens component includes at least two lenses which include a first surface, a second surface, a third surface and a fourth surface sequentially arranged. An absolute value of a curvature radius of the fourth surface is greater than that of the first surface, a ratio of a curvature radius of the third surface to that of the fourth surface is 0.3 to 0.8, and an absolute value ratio of a conic constant of the third surface to that of the fourth surface is no greater than 0.2.

20 Claims, 10 Drawing Sheets

(56) References Cited

U.S. PATENT DOCUMENTS

| | | | | |
|---|---|---|---|---|
| 2018/0120579 | A1 | 5/2018 | Gollier et al. | |
| 2020/0041785 | A1 | 2/2020 | Takagi et al. | |
| 2020/0158953 | A1* | 5/2020 | Tohara | G02B 25/001 |
| 2020/0192079 | A1 | 6/2020 | Tohara et al. | |
| 2021/0231957 | A1* | 7/2021 | Taketani | G02B 3/00 |
| 2021/0239969 | A1* | 8/2021 | Tohara | G02B 27/283 |
| 2021/0239985 | A1* | 8/2021 | Tohara | G02B 17/08 |
| 2021/0294105 | A1 | 9/2021 | He et al. | |
| 2023/0091523 | A1* | 3/2023 | Kondo | G02B 25/001 359/465 |
| 2023/0324669 | A1* | 10/2023 | Yun | G02B 5/3033 359/630 |
| 2023/0359033 | A1* | 11/2023 | Iba | G02B 3/04 |
| 2025/0052984 | A1* | 2/2025 | Fu | G02B 17/0856 |
| 2025/0102854 | A1* | 3/2025 | Li | G02F 1/13363 |

FOREIGN PATENT DOCUMENTS

| | | | |
|---|---|---|---|
| CN | 112558287 | A | 3/2021 |
| CN | 112596238 | A | 4/2021 |
| CN | 114236828 | B | 3/2023 |
| CN | 116224585 | A | 6/2023 |

* cited by examiner

OPTICAL SYSTEM AND DISPLAY APPARATUS

CROSS-REFERENCE TO RELATED APPLICATION

The present application claims priority to Chinese Patent Application No. 2023109962862, filed on Aug. 8, 2023, the disclosure of which is incorporated herein in its entirety as part of the present application.

TECHNICAL FIELD

The present disclosure relates to an optical system and a display apparatus.

BACKGROUND

A virtual reality (VR) apparatus generates a virtual three-dimensional environment that users may interact with by using computer technology combined with optoelectronic sensing technology. The virtual reality apparatus includes glasses and a display screen, and the glasses adopt a folded optical path (Pancake), Pancake is gradually being applied to a head-mounted display system because of a compact structure and a lightweight characteristic thereof.

SUMMARY

Embodiments of the present disclosure provide an optical system and a display apparatus.

An embodiment of the present disclosure provides an optical system, which includes: a lens component, a transflective film, a reflective polarization layer, and a phase retardation film. The lens component includes at least two lenses, the at least two lenses include a first surface, a second surface, a third surface and a fourth surface arranged sequentially along a direction of an optical axis of the lens component, and the second surface and the third surface having a same surface type parameter; the transflective film is located between the second surface and the third surface of the lens component; the reflective polarization layer is located on a side of the fourth surface of the lens component that is away from the first surface of the lens component; and the phase retardation film is located on a side of the transflective film that is away from the first surface. Light transmitted through the transflective film and then incident on the lens component is configured to be folded back between the transflective film and the reflective polarization layer, and exit from the reflective polarization layer; the first surface and the second surface are two surfaces of a same lens, the first surface is a convex surface, the second surface is a concave surface, the third surface is a convex surface, the fourth surface is a concave surface; an absolute value of a curvature radius of the fourth surface is greater than an absolute value of a curvature radius of the first surface, a ratio of a curvature radius of the third surface to the curvature radius of the fourth surface is 0.3 to 0.8, and an absolute value ratio of a conic constant of the third surface to a conic constant of the fourth surface is no greater than 0.2.

For example, according to an embodiment of the present disclosure, a distance between two intersection points where the first surface and the second surface intersect with the optical axis is a first distance, a distance between two intersection points where the third surface and the fourth surface intersect with the optical axis is a second distance; the first distance is less than the second distance, and a ratio of the second distance to a focal length of the optical system is 0.45 to 0.7.

For example, according to an embodiment of the present disclosure, a ratio of the curvature radius of the first surface to a focal length of the optical system is −1.5 to −2.5, and the conic constant of the first surface is close to negative infinity, or the curvature radius of the first surface is a negative value infinitely close to zero, and the conic constant of the first surface is −15 to −25; s a ratio of the curvature radius of the second surface to the focal length of the optical system and a ratio of the curvature radius of the third surface to the focal length of the optical system are both −1.75 to −2.5, and the conic constant of the second surface and the conic constant of the third surface are both −10 to 10; sa ratio of the curvature radius of the fourth surface to the focal length is −3.5 to −5, and the conic constant of the fourth surface is −100 to −50.

For example, according to an embodiment of the present disclosure, a ratio of the first distance to the focal length of the optical system is 0.15 to 0.25.

For example, according to an embodiment of the present disclosure, a ratio of an aperture of the lens component to the focal length of the optical system is 2 to 3.

For example, according to an embodiment of the present disclosure, a ratio of a total track length of the optical system to the focal length of the optical system is 0.8 to 1.

For example, according to an embodiment of the present disclosure, the phase retardation film is located between the reflective polarization layer and the transflective film, or located on a side of the reflective polarization layer that is away from the transflective film.

For example, according to an embodiment of the present disclosure, the optical system further includes: a linear polarization film, located on a side of the reflective polarization layer that is away from the transflective film.

For example, according to an embodiment of the present disclosure, the lens component includes a first lens, a second lens and a third lens arranged sequentially along the direction of the optical axis; the first lens includes the first surface and the second surface, the second lens includes the third surface, the third lens includes the fourth surface, the second lens further includes a fifth surface opposite to the third surface, the third lens further includes a sixth surface located on a side of the fourth surface that is close to the fifth surface; the fifth surface and the sixth surface are both flat surfaces; or the fifth surface and the sixth surface have a same surface type, and an absolute value of a curvature radius of the fifth surface in at least one direction is greater than an absolute value of a curvature radius of other surfaces; the phase retardation film is located on the fifth surface or the sixth surface.

For example, according to an embodiment of the present disclosure, the absolute value of the curvature radius in the at least one direction of the fifth surface is greater than 100 millimeters.

For example, according to an embodiment of the present disclosure, a distance between two intersection points where two surfaces of the first lens intersect with the optical axis is the first distance, a distance between two intersection points where two surfaces of the second lens intersect with the optical axis is a third distance, a distance between two intersection points where two surfaces of the third lens intersect with the optical axis is a fourth distance; and the first distance and the fourth distance are both less than the third distance.

For example, according to an embodiment of the present disclosure, a ratio of a sum of the third distance and the fourth distance to the second distance is 0.9 to 1.1.

For example, according to an embodiment of the present disclosure, a ratio of the third distance to the focal length is 0.3 to 0.45, and a ratio of the fourth distance to the focal length is 0.15 to 0.25.

For example, according to an embodiment of the present disclosure, a ratio of a center thickness to an edge thickness of the second lens is greater than or equal to 0.5 and no greater than 3, and a ratio of an edge thickness to a center thickness of the third lens is greater than or equal to 0.5 and no greater than 2.

For example, according to an embodiment of the present disclosure, an exit pupil distance of the optical system is 12 millimeters to 20 millimeters.

For example, according to an embodiment of the present disclosure, the second lens and the third lens are made of a same material, and a material of the first lens is different from the material of the second lens.

For example, according to an embodiment of the present disclosure, the lens component includes a first lens and a second lens arranged sequentially along the direction of the optical axis, the first lens includes the first surface and the second surface, and the second lens includes the third surface and the fourth surface; the phase retardation film is located between the reflective polarization layer and the transflective film, or located on a side of the reflective polarization layer that is away from the fourth surface.

For example, according to an embodiment of the present disclosure, the phase retardation film is located between the reflective polarization layer and the transflective film, and the reflective polarization layer is configured to reflect linearly polarized light of one characteristic and transmit linearly polarized light of another characteristic; or, the phase retardation film is located on a side of the reflective polarization layer that is away from the fourth surface, and the reflective polarization layer includes a cholesteric liquid crystal layer.

An embodiment of the present disclosure provides a display apparatus, which includes a display screen and any optical system as mentioned above, the optical system is located on a display side of the display screen, and the second surface is located on a side of the first surface that is away from the display screen.

For example, according to an embodiment of the present disclosure, the display screen includes a plurality of sub-pixels and a microlens array located on a light emergent side of the plurality of sub-pixels.

BRIEF DESCRIPTION OF DRAWINGS

In order to more clearly illustrate the technical solutions of the embodiments of the present disclosure, the accompanying drawings of the embodiments will be briefly introduced below, it is obvious that the accompanying drawings in the following description merely relate to some embodiments of the present disclosure, but not the limitations of the present disclosure.

DETAILED DESCRIPTION

Figure 1:
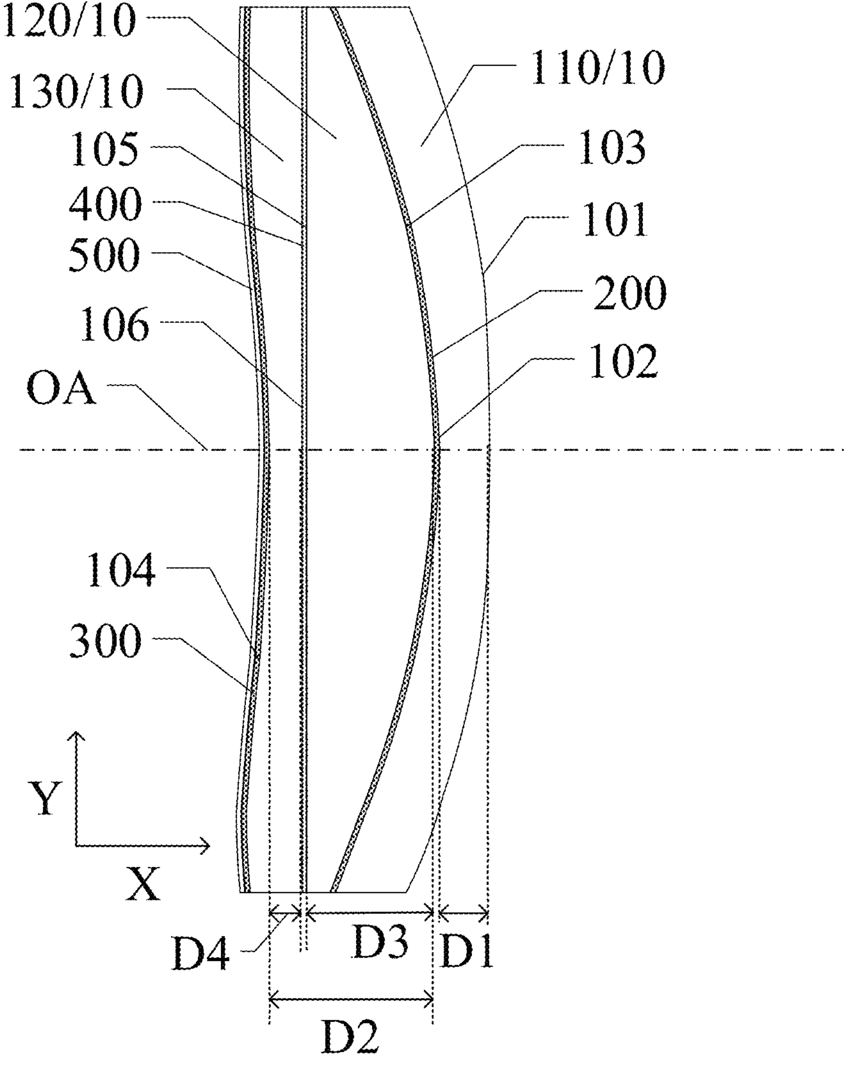
FIG. 1 is a cross-sectional view of an optical system provided according to an example of an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

The present disclosure provides an optical system and a display apparatus. The optical system includes a lens component, a transflective film, a reflective polarization layer, and a phase retardation film. The lens component includes at least two lenses, the at least two lenses include a first surface, a second surface, a third surface, and a fourth surface arranged sequentially along an direction of the optical axis of the lens component, the second surface and the third surface have a same surface type parameter; the transflective film is located between the second surface and the third surface of the lens component; the reflective polarization layer is located on a side of the fourth surface of the lens component that is away from the first surface; and the phase retardation film is located on a side of the transflective film that is away from the first surface. Light transmitted through the transflective film and then incident on the lens component is configured to be folded back between the transflective film and the reflective polarization layer, and exit from the reflective polarization layer; the first surface and the second surface are two surfaces of a same lens, the first surface is a convex surface, the second surface is a concave surface, the third surface is a convex surface, the fourth surface is a concave surface; an absolute value of a curvature radius of the fourth surface is greater than an absolute value of a curvature radius of the first surface, a ratio of a curvature radius of the third surface to the curvature radius of the fourth surface is 0.3 to 0.8, and an absolute value ratio of a conic constant of the third surface to a conic constant of the fourth surface is no greater than 0.2.

In the optical system provided by the present disclosure, the lens component is set to include at least four surfaces, in which two surfaces are respectively provided with a transflective film and a reflective polarization layer to realize the folding of light; curvature radius relationships of the first surface, the second surface, the third surface and the fourth surface are set, and conic constant relationships of the third surface and the fourth surface are set, thereby providing an optical system having characteristics of ultra-short focus and large field of view.

The optical system and the display apparatus provided by the embodiments of the present disclosure are described below with reference to the drawings.

Figure 2:
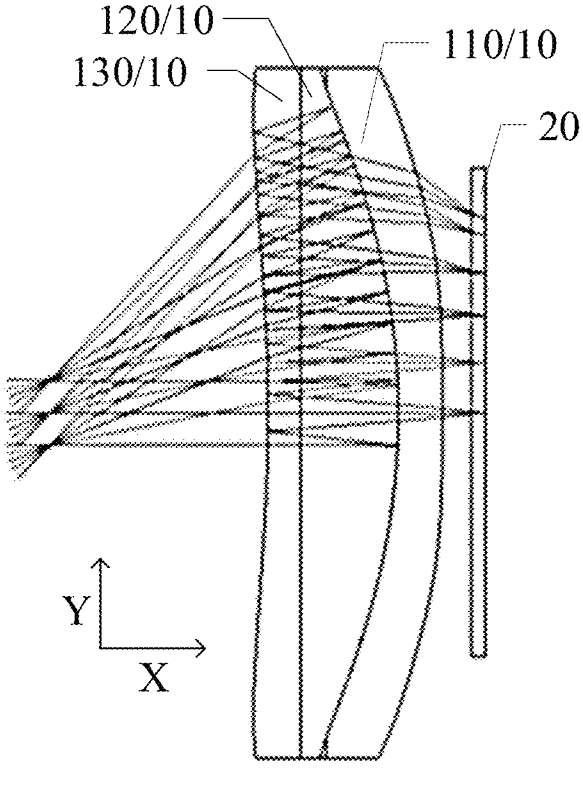
FIG. 2 is an optical path diagram when the optical system shown in FIG. 1 is applied to a display apparatus.

FIG. 1 is a cross-sectional view of an optical system provided according to an example of an embodiment of the present disclosure. FIG. 2 is an optical path diagram when the optical system shown in FIG. 1 is applied to a display apparatus.

As shown in FIG. 1, the optical system includes a lens component 10, a transflective film 200, a reflective polarization layer 300, and a phase retardation film 400.

As shown in FIG. 1, the lens component 10 includes at least two lenses, the at least two lenses include a first surface 101, a second surface 102, a third surface 103 and a fourth surface 104 arranged sequentially along an direction of the optical axis OA of the lens component 10, and the second surface 102 and the third surface 103 have a same surface type parameter. The first surface 101 and the second surface 102 are two surfaces of a same lens, the first surface 101 is convex surface, the second surface 102 is a concave surface, the third surface 103 is a convex surface, and the fourth surface 104 is a concave surface. For example, the lens including the first surface 101 and the second surface 102 may be a negative lens. For example, at least one of the first surface 101, the second surface 102, the third surface 103 and the fourth surface 104 includes a spherical surface, an aspherical surface, and a freeform surface. For example, the first surface 101 is an aspherical surface. For example, the second surface 102, the third surface 103 and the fourth surface 104 are all aspherical surfaces. The second surface 102 and the third surface 103 as described above have the same surface type parameter refers to that the second surface may be substantially completely attached to the third surface without considering presence of other film layers between the two.

For example, the optical axis OA is parallel to an X direction shown in the diagram. For example, FIG. 1 schematically shows that the second surface 102 is bonded to the third surface 103, which may improve the compactness of the optical system while alleviating a ghost problem. But it is not limited thereto; an air gap may also be provided between the second surface and the third surface, to improve the design freedom of the optical system.

As shown in FIG. 1, the transflective film 200 is located between the second surface 102 and the third surface 103 of the lens component 10. For example, the transflective film 200 may be provided on the third surface 103. For example, the transflective film 200 may be plated on the third surface 103. For example, the transflective film 200 may be provided on the second surface 102.

For example, as shown in FIG. 1, the transflective film 200 is configured to transmit a portion of light and reflect another portion of light. For example, the transflective film 200 may include at least one film layer; for example, a thickness of each film layer may be 10 nanometers to 200 nanometers. For example, the transflective film 200 may have transmittance of 50%, and reflectance of 50%. For example, the transflective film 200 may have transmittance of 60%, and reflectance of 40%. For example, the transflective film 200 may have transmittance of 65%, and reflectance of 35%. The optical system provided by the present disclosure is not limited thereto; and transmittance and reflectance of the transflective film may be set according to product requirements.

As shown in FIG. 1, the reflective polarization layer 300 is located on a side of the fourth surface 104 of the lens component 10 that is away from the first surface 101 of the lens component 10. For example, the reflective polarization layer 300 may be provided on the fourth surface 104. For example, the reflective polarization layer 300 may be a polarization reflective film, and the reflective polarization layer 300 is configured to reflect linearly polarized light of one characteristic and transmit linearly polarized light of another characteristic.

For example, as shown in FIG. 1, the reflective polarization layer 300 has functions as follows: the film layer plane has a transmission axis direction, and incident light has transmittance of a polarization component parallel to the transmission axis direction (e.g., s-linearly polarized light) greater than transmittance of a polarization component perpendicular to the transmission axis direction (e.g., p-linearly polarized light), and reflectance of the polarization component parallel to the transmission axis direction (e.g., s-linearly polarized light) less than reflectance of the polarization component perpendicular to the transmission axis direction (e.g., p-linearly polarized light). For example, the reflective polarization layer 300 may also be referred to as a polarization beam splitter film. For example, transmittance of polarized light parallel to the transmission axis direction of the reflective polarization layer 300 is no less than 85%, for example, no less than 90%, for example, no less than 95%, for example, no less than 98%; and reflectance of polarized light perpendicular to the transmission axis direction of the reflective polarization layer 300 is no less than 85%, for example, no less than 90%, for example, no less than 95%, for example, no less than 98%. For example, the reflective polarization layer 300 may include a dual brightness enhancement film (DBEF).

As shown in FIG. 1, the phase retardation film 400 is located on a side of the transflective film 200 that is away from the first surface 100. For example, the phase retardation film 400 is located between the reflective polarization layer 300 and the transflective film 200. For example, the phase retardation film 400 is configured to cause the transmitted light to implement transition between a circularly polarized state and a linearly polarized state. For example, the phase retardation film 400 may be a ¼ wave plate. For example, the material of the phase retardation film 400 may include liquid crystal polymer or polycarbonate. For example, the phase retardation film 400 has characteristics below: the film layer plane has a direction with the lowest refractive index and a direction with the highest refractive index, which are respectively a fast axis and a slow axis; polarized light parallel to the slow axis is delayed by ¼ wavelength after passing through the phase retardation film 400 as compared with polarized light parallel to the fast axis.

For example, as shown in FIG. 1, an included angle between the slow axis of the phase retardation film 400 and a transmission axis of the reflective polarization layer 300 is 45 degrees.

In some examples, as shown in FIG. 1, the optical system further includes a linear polarization film 500 located on a side of the reflective polarization layer 300 that is away from the transflective film 200.

For example, as shown in FIG. 1, a transmission axis of the linear polarization film 500 coincides with the transmission axis of the reflective polarization layer 300; for example, the linear polarization film 500 may be further used for filtering out other stray light, allowing only polarized light (e.g., s-linearly polarized light) to pass through the linear polarization film 500 and enter a human eye. For example, the linear polarization film 500 may adopt a three-layer structure, a middle layer in the three-layer structure may be made of polyvinyl alcohol (PVA) added with dichroic molecules, at least one layer on both sides of the middle layer in the three-layer structure may be made of triacetate cellulose (TAC), and a total thickness of the three-layer structure may be 40 microns to 200 microns.

For example, as shown in FIG. 1, the reflective polarization layer 300 is attached to the fourth surface 104, and the linear polarization film 500 is attached to a surface of the reflective polarization layer 300. For example, a surface of the linear polarization film 500 that faces the air is subjected to anti-reflection treatment. For example, the surface of the linear polarization film 500 that faces the air may be attached to a moth eye film.

As shown in FIG. 1 and FIG. 2, light, for example, light emitted from the display panel 20, transmitted through the transflective film 200, and then incident on the lens component 10, is configured to be folded back between the transflective film 200 and the reflective polarization layer 300 and exit from the reflective polarization layer 300, to realize an ultra-short focal folded optical path (Pancake).

For example, as shown in FIG. 1 and FIG. 2, the folded optical path has a principle as follows: a wave plate may be provided on an emergent side of the display screen 20 that is located on a side of the first surface 101 that is away from the second surface 102; image light emitted from the display screen is converted into right-handed circularly polarized light after passing through the wave plate; the right-handed circularly polarized light is refracted at the first surface 101 of the lens component 10 and incident on the transflective film 200, and the right-handed circularly polarized light keeps a polarized state unchanged after being transmitted by the transflective film 200. The right-handed circularly polarized light reaches the phase retardation film 400; the right-handed circularly polarized light incident on the phase retardation film 400 is converted into p-linearly polarized light; the p-linearly polarized light is reflected back by the reflective polarization layer 300 to the phase retardation film 400, where a first reflection occurs. Afterwards, the p-linearly polarized light is converted into right-handed circularly polarized light after passing through the phase retardation film 400; the right-handed circularly polarized light reaches the transflective film 200 and is reflected at the transflective film 200, where a second reflection occurs. Because of half wave loss, the reflected light changes from right-handed circularly polarized light to left-handed circularly polarized light. The left-handed circularly polarized light is transformed into s-linearly polarized light through the phase retardation film 400, and then the s-linearly polarized light is transmitted through the reflective polarization layer 300 and the linear polarization film 500 to a human eye.

The above-described folded optical path may change a polarized state of light propagating between the reflective polarization layer and the transflective film, implementing folding of a light path, so that an original focal length of the optical system is folded because of, for example, two reflections added by providing the reflective polarization layer, the phase retardation film, and the transflective film as described above, which greatly compresses space required between the human eye and the optical system, resulting in a smaller and lighter volume of the optical system.

For example, as shown in FIG. 2, light emitted by the display screen 20 is refracted or reflected by respective optical surfaces in the optical system, and finally forms an upright magnified image at a fixed distance in front of the human eye. The image is not formed by actual light converged, but formed by converged reverse extension lines of light refracted to the human eye, so the image is referred to as a virtual image.

As shown in FIG. 1, an absolute value of a curvature radius of the fourth surface 104 is greater than an absolute value of a curvature radius of the first surface 101, a ratio of a curvature radius of the third surface 103 to the curvature radius of the fourth surface 104 is 0.3 to 0.8, and an absolute value ratio of a conic constant of the third surface 103 to a conic constant of the fourth surface 104 is no greater than 0.2.

In some examples, as shown in FIG. 1, a distance between two intersection points where the first surface 101 and the second surface 102 intersect with the optical axis OA is a first distance D1, a distance between two intersection points where the third surface 103 and the fourth surface 104 intersect with the optical axis OA is a second distance D2, the first distance D1 is less than the second distance D2, and a ratio of the second distance D2 to a focal length of the optical system is 0.45 to 0.7.

The optical system provided by the embodiment of the present disclosure is an optical system adopting folded optical path (Pancake); in the optical system, the lens component is set to include at least four surfaces, in which two surfaces are respectively provided with the transflective film and the reflective polarization layer to realize the folding of light; curvature radius relationships of the first surface, the second surface, the third surface and the fourth surface are set, conic constant relationships of the third surface and the fourth surface are set, and meanwhile, distance relationships between the respective surfaces as well as ratio relationships with the focal length of the optical system are set, thereby providing an optical system having characteristics of ultra-short focus and large field of view.

As compared with a single lens provided with only two surfaces, the optical system provided by the present disclosure is provided with at least four surfaces, which is favorable for improving the degree of freedom in the design of the surface type parameter of the optical system, so as to enhance display performances including clarity, aberration correction, and increased field of view, etc.

By providing the transflective film between the second surface and the third surface, light emitted from the display panel is refracted through at least one air-medium interface before being incident on the transflective film, which is favorable for deflecting light and improving the field of view.

For example, as shown in FIG. 1, the ratio of the curvature radius of the third surface 103 to the curvature radius of the fourth surface 104 may be 0.5 to 0.7; and the absolute value ratio of the conic constant of the third surface 103 to the conic constant of the fourth surface 104 is no greater than 0.18. For example, the ratio of the curvature radius of the third surface 103 to the curvature radius of the fourth surface 104 may be 0.4 to 0.6; and the absolute value ratio of the conic constant of the third surface 103 to the conic constant of the fourth surface 104 is no greater than 0.15. For example, the ratio of the curvature radius of the third surface 103 to the curvature radius of the fourth surface 104 may be 0.35 to 0.55; and the absolute value ratio of the conic constant of the third surface 103 to the conic constant of the fourth surface 104 is no greater than 0.12. For example, the ratio of the curvature radius of the third surface 103 to the curvature radius of the fourth surface 104 may be 0.45 to 0.75; and the absolute value ratio of the conic constant of the third surface 103 to the conic constant of the fourth surface 104 is no greater than 0.1.

For example, as shown in FIG. 1, the ratio of the second distance D2 to the focal length of the optical system is 0.5 to 0.6. For example, the ratio of the second distance D2 to the focal length of the optical system is 0.48 to 0.65. For example, the ratio of the second distance D2 to the focal length of the optical system is 0.55 to 0.68.

In some examples, as shown in FIG. 1 and FIG. 2, a ratio of the curvature radius of the first surface 101 to the focal length is −1.5 to −2.5, and the conic constant of the first surface 101 is close to negative infinity, or the curvature radius of the first surface 101 is a negative value infinitely close to zero, and the conic constant of the first surface is −15 to −25; ratios of the curvature radii of the second surface 102 and the third surface 103 to the focal length are both −1.75 to −2.5, and conic constants of the second surface 102 and the third surface 103 are both −10 to 10; a ratio of the curvature radius of the fourth surface to the focal length 104 is −3.5 to −5, and the conic constant of the fourth surface 104 is −100 to −50.

In some examples, as shown in FIG. 1, the ratio of the first distance D1 to the focal length is 0.15 to 0.25.

In some examples, as shown in FIG. 1 and FIG. 2, a ratio of a total track length (TTL) of the optical system to the focal length is 0.8 to 1.

In some examples, as shown in FIG. 1, a ratio of an aperture of the lens component 10 to the focal length of the optical system is 2 to 3. The above-described aperture of the lens component 10 refers to an effective clear aperture, for example, a maximum aperture allowing light to pass through the lens component 10, and the aperture is determined by a maximum luminous flux of the lens component 10.

For example, as shown in FIG. 1, an exit pupil distance of the optical system is 12 millimeters to 20 millimeters.

By setting the ratio relationships between the curvature radii of the respective surfaces to the focal length of the optical system, setting the conic constants of the respective surfaces, setting the ratio relationships between distances of different surfaces and the focal length, setting the ratio relationships between the total track length and the focal length, and setting the ratio relationships between the aperture of the lens component and the focal length of the optical system, the optical system may have a suitable exit pupil distance while having a display effect of ultra-short focal length and large field of view, which improves user experience.

For example, as shown in FIG. 1, the ratio of the curvature radius of the first surface 101 to the focal length is −1.7 to −2, and the conic constant of the first surface 101 is close to negative infinity. For example, the curvature radius of the first surface 101 is a negative value infinitely close to zero, and the conic constant of the first surface is −20.

For example, as shown in FIG. 1, for example, the ratios of the curvature radii of the second surface 102 and the third surface 103 to the focal length are both −1.8 to −2, and the conic constants of the second surface 102 and the third surface 103 are both 0 to 1. For example, the ratios of the curvature radii of the second surface 102 and the third surface 103 to the focal length are both −1.85 to −2.3, and the conic constants of the second surface 102 and the third surface 103 are both −10 to 0. For example, the ratios of the curvature radii of the second surface 102 and the third surface 103 to the focal length are both −1.9 to −1.95, and the conic constants of the second surface 102 and the third surface 103 are both −8 to −5.

For example, as shown in FIG. 1, the ratio of the curvature radius of the fourth surface 104 to the focal length is −3.8 to −4.5, and the conic constant of the fourth surface 104 is −90 to −60. For example, the ratio of the curvature radius of the fourth surface 104 to the focal length is −4 to −4.8, and the conic constant of the fourth surface 104 is −80 to −70.

For example, as shown in FIG. 1, the ratio of the first distance D1 to the focal length is 0.18 to 0.2. For example, the ratio of the first distance D1 to the focal length is 0.17 to 0.22. For example, the ratio of the first distance D1 to the focal length is 0.16 to 0.21. For example, the ratio of the first distance D1 to the focal length is 0.19 to 0.24.

For example, as shown in FIG. 1, the first distance D1 may be a center thickness of the lens including the first surface 101 and the second surface 102.

For example, as shown in FIG. 1, the ratio of the total track length (TTL) of the optical system to the focal length may be 0.85 to 1. For example, the ratio of the total track length of the optical system to the focal length may be 0.8 to 0.95. For example, the ratio of the total track length of the optical system to the focal length may be 0.89 to 0.9. For example, the above-described total track length may refer to an axial distance between a highest point on the fourth surface that is closest to the human eye in the optical system and a display surface of the display panel. The highest point on the fourth surface includes an edge sagittal height of the lens component 10 that is on the fourth surface side.

For example, as shown in FIG. 1, the ratio of the aperture of the lens component 10 to the focal length is 2.2 to 2.5. For example, the ratio of the aperture of the lens component 10 to the focal length is 2.4 to 2.8. For example, the ratio of the aperture of the lens component 10 to the focal length is 2.25 to 2.6. For example, the ratio of the aperture of the lens component 10 to the focal length is 2.3 to 2.7.

For example, as shown in FIG. 1, the ratio of the total track length of the optical system to the aperture of the lens component 10 is 35%.

For example, as shown in FIG. 1, the exit pupil distance of the optical system is 13 millimeters to 18 millimeters. For example, the exit pupil distance of the optical system is 15 millimeters to 17 millimeters. For example, the exit pupil distance of the optical system is 16 millimeters to 19 millimeters.

For example, as shown in FIG. 1, the field of view of the optical system may be 90 degrees to 110 degrees. For example, the field of view of the optical system may be over 100 degrees.

For example, as shown in FIG. 1, the curvature radius of the above-described surface in the lens component 10 is a curvature radius of a base spherical surface on a surface thereof. The above-described “base spherical surface” refers to a spherical surface serving as a basis for further deformation to form an aspherical surface, and thus, the spherical surface is just the base spherical surface of the aspherical surface. For example, the third surface 103 and the fourth surface 104 may both be aspherical surfaces, for example, both be even aspheric surface (EVENASPH).

For example, a surface type of the aspherical surface is represented by a numerical formula below:

$$z = \frac{CY^2}{1+\sqrt{1-(1+k)C^2Y^2}} + \sum_{i=1}^{N} \alpha_i Y^{2i}.$$

For example, in the above-described formula, the height of the aspherical surface along a direction perpendicular to the optical axis is Y, and a distance between a vertex of the aspherical surface and a projection of a position whose height is Y in the aspherical surface on the optical axis is z, that is, Z is a coordinate along the direction of the optical axis; C is a curvature (a reciprocal of the curvature radius R), k is a conic constant, $\alpha_i$ is a coefficient of each higher-order term, and 2i is the order of aspherical coefficient.

When optimizing rational configuration of the surface type parameter of the lens component 10 in practice, values such as the curvature radius, the conic constant, the height, and the aspherical coefficient of the surface of the lens component 10 are put into the above-described numerical formula, so that respective optimization parameters that may correct aberrations of the optical system are obtained through optical simulation calculation.

For example, the high-order coefficient of the third surface 103 satisfies: $\alpha_4$=6.0e-005, $\alpha_6$=−1e-010, $\alpha_8$=−2e-011. For example, the high-order coefficient of the fourth surface 104 satisfies: $\alpha_4$=5.3e-007, $\alpha_6$=8e-010, $\alpha_8$=8e-012.

In some examples, as shown in FIG. 1, the lens component 10 includes a first lens 110, a second lens 120 and a third lens 130 arranged sequentially along the direction of the optical axis OA; the first lens 110 includes the first surface 101 and the second surface 102, the second lens 120 includes the third surface 103, the third lens 130 includes a fourth surface 104, the second lens 120 further includes a fifth surface 105 opposite to the third surface 103, the third lens 130 further includes a sixth surface 106 located on a side of the fourth surface 104 that is close to the fifth surface 105; the fifth surface 105 and the sixth surface 106 are both flat surfaces; and the phase retardation film 400 is located on the fifth surface 105 or the sixth surface 106. For example, the phase retardation film 400 is attached to the fifth surface 105 or the sixth surface 106.

The phase retardation film includes the birefringent material; and the phase retardation film is attached to a flat surface having a planar shape, which may improve the flatness of the film material, overcome process challenges caused by curved attaching, and avoid a softening and stretching process of the above-described film material which affects birefringence properties such as optical axis angle and phase delay, so it is easy to maintain fixed phase delay, and is favorable for improving overall optical performance of the optical system, such as clarity, stray light, and field of view, to ensure imaging quality.

For example, as shown in FIG. 1, the transflective film 200 is plated on the third surface of the second lens 120, the first lens 110 is attached to the transflective film 200, the phase retardation film 400 is attached to the fifth surface 105 of the second lens 120, and the sixth surface 106 is attached to the phase retardation film 400. For example, the first lens 110 is bonded to the second lens 120, and the second lens 120 is bonded to the third lens 130.

For example, as shown in FIG. 1, apertures of the first lens 110, the second lens 120 and the third lens 130 may be substantially equal to each other; for example, ratios of the apertures of the three lenses to the focal length of the optical system are all 2 to 3.

In some examples, as shown in FIG. 1, a distance between two intersection points where two surfaces of the first lens 110 intersect with the optical axis OA is the first distance D1; a distance between two intersection points where two surfaces of the second lens 120 intersect with the optical axis OA is a third distance D3; a distance between two intersection points where two surfaces of the third lens 130 intersect with the optical axis OA is a fourth distance D4; and the first distance D1 and the fourth distance D4 are both less than the third distance D3.

For example, as shown in FIG. 1, a center thickness of the second lens 120 is the third distance D3, and a center thickness of the third lens 130 is the fourth distance D4. For example, the second lens 120 may be a positive lens. For example, the second lens 120 may be a planoconvex lens. For example, the third lens 130 may be a negative lens. For example, the third lens 130 may be a planoconcave lens.

In some examples, as shown in FIG. 1, the ratio of the first distance D1 to the focal length is 0.15 to 0.25, a ratio of the third distance D3 to the focal length is 0.3 to 0.45, and a ratio of the fourth distance D4 to the focal length is 0.15 to 0.25.

For example, as shown in FIG. 1, the ratio of the first distance D1 to the focal length is 0.18 to 0.2, the ratio of the third distance D3 to the focal length is 0.35 to 0.4, and the ratio of the fourth distance D4 to the focal length is 0.18 to 0.2. For example, the ratio of the first distance D1 to the focal length is 0.17 to 0.23, the ratio of the third distance D3 to the focal length is 0.33 to 0.42, and the ratio of the fourth distance D4 to the focal length is 0.17 to 0.22. For example, the ratio of the first distance D1 to the focal length is 0.19 to 0.24, the ratio of the third distance D3 to the focal length is 0.38 to 0.43, and the ratio of the fourth distance D4 to the focal length is 0.16 to 0.24.

In some examples, as shown in FIG. 1, a ratio of a sum of the third distance D3 and the fourth distance D4 to the second distance D2 is 0.9 to 1.1. For example, FIG. 1 schematically shows impact of the respective film layers on distances between different surfaces of the lens component. In the case where the thicknesses of the respective film layers are relatively thin, the thicknesses of the film layer may be ignored; and at this time, a sum of the center thickness of the second lens and the center thickness of the third lens may be the above-described second distance.

In some examples, as shown in FIG. 1, the second lens 120 and the third lens 130 are made of the same material, and the material of the first lens 110 is different from the material of the second lens 120, which is favorable for correcting chromatic aberration. For example, refractive indices of the second lens 120 and the third lens 130 may be 1.45 to 1.75. By selecting a greater refractive index for the second lens and the third lens, it is favorable for obtaining a greater curvature radius.

The second lens and the third lens are made of the same material, which is convenient for fabricating the optical system.

For example, as shown in FIG. 1, Abbe numbers of the second lens 120 and the third lens 130 are both greater than 50. For example, the Abbe number of the first lens 110 is different from the Abbe numbers of the second lens 120 and the third lens 130.

For example, as shown in FIG. 1, the materials of the second lens 120 and the third lens 130 may be cycloolefin copolymer (COC), for example, resin, with a refractive index of 1.54 and an Abbe number vd of 56. For example, the material of the first lens 110 may be polymethyl methacrylate (PMMA), for example, organic glass, with a refractive index of 1.49 and an Abbe number of 57.2. For example, the material of the first lens 110 may be polystyrene (PS), with a refractive index of 1.59 and an Abbe number of 30.8. Of course, the embodiment of the present disclosure is not limited thereto; the material of the first lens may also be the same as the material of the second lens and the third lens, or the material of the second lens may be different from the material of the third lens.

For example, as shown in FIG. 1, when the aperture of the optical system satisfies a field of view being no less than 100 degrees, a thickness of an edge of at least one lens (a position outside the effective clear aperture) may be reduced, to reduce weight of the optical system. For example, when the optical system provided by the present disclosure is applied to a display apparatus, the weight of the binocular lens does not exceed 30 grams.

For example, as shown in FIG. 1, an antireflection film may be provided on a surface of the first lens 110 that is away from the second lens 120.

Figure 3:
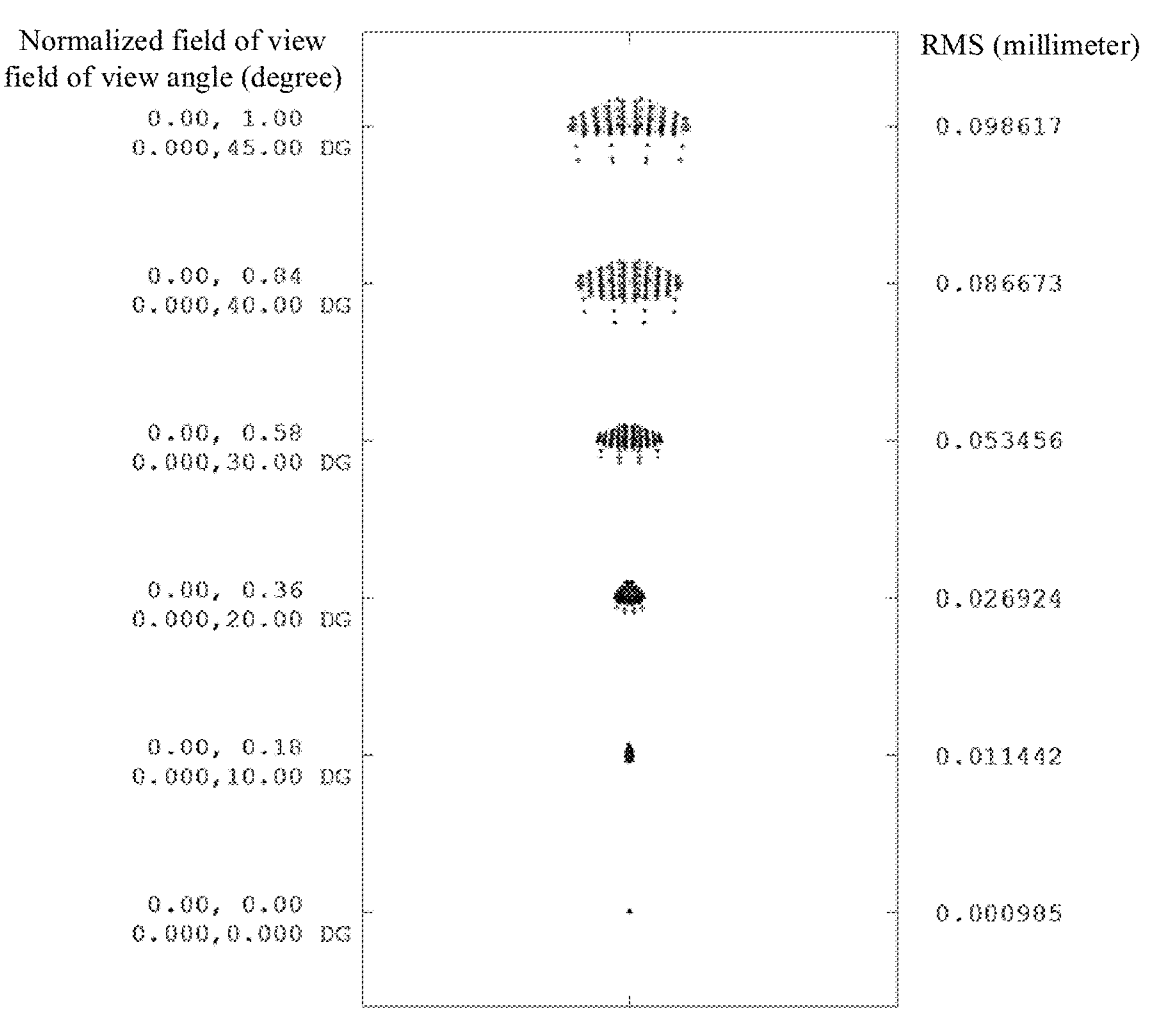
FIG. 3 is a spot diagram of the optical system shown in FIG. 1.
Figure 4:
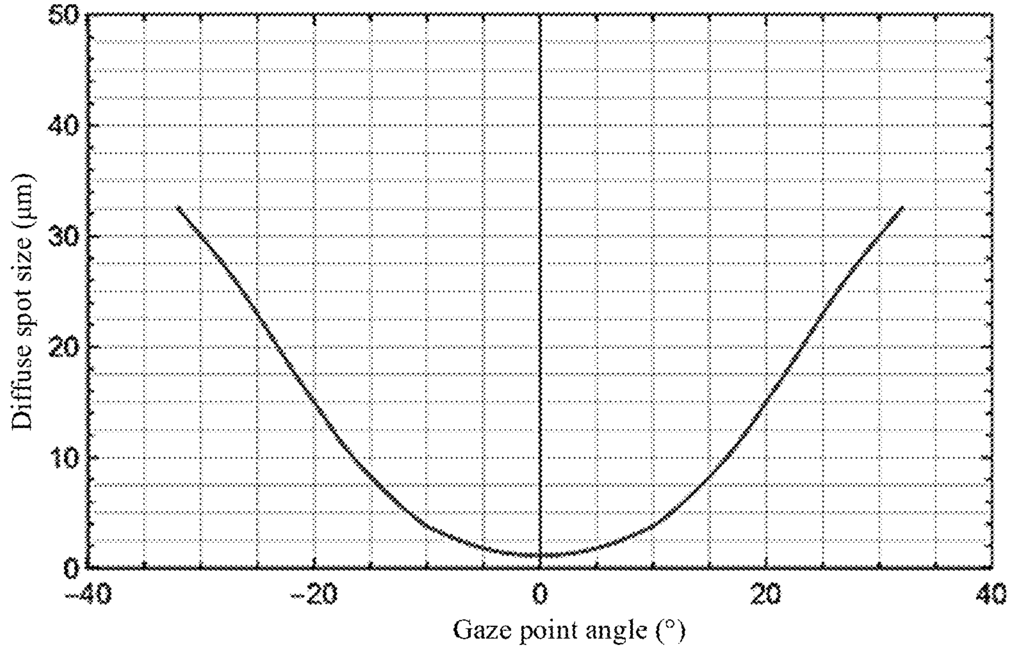
FIG. 4 is a curve chart of a size of a diffuse spot of the optical system shown in FIG. 1 changing with gaze point.

FIG. 3 is a spot diagram of the optical system shown in FIG. 1. FIG. 4 is a curve chart of a size of a diffuse spot, for example, a root mean square (RMS) of the diffuse spot diameter, of the optical system shown in FIG. 1 changing with gaze point. FIG. 3 shows a normalized field of view in the X direction, a normalized field of view in the Y direction, a field of view in the X direction and a field of view in the Y direction, as well as root mean squares (RMSs) of the diffuse spot diameter at different fields of view.

A spot diagram refers to a diffused graph formed by spots distributed in a certain range, in which the spots are intersection points of many rays emitted from a single point passing through an optical system with an image plane that are no longer concentrated at a same point because of aberration; and the spot diagram may be used to evaluate imaging quality of an optical system. FIG. 3 is usually used to evaluate the full field clarity of the optical system, that is, imaging clarity of the full field of view that may be covered by residual sight when a human eye pupil is located at an entrance pupil position on an optical axis and is gazed on a center of the optical system (i.e., a zero field of view), which is also referred to as a transient mode. Besides the full field clarity in the mode, gaze point clarity is a more important optical indicator for a head display wearer, for example, the clarity of an image within a certain angular range that may be directly seen (rather than being seen by residual sight) when the eye rotates up, down, left and right.

In the gaze point mode, the eye rotates a certain angle, and the pupil deviates from the center of the optical axis, causing certain deviation from the Z direction and the Y direction of the optical axis, and a certain included angle between a main ray passing through the center of the pupil and the Z axis. For example, a range of the included angle is ±35 degrees to take into account the observation habits of the human eye; for example, in the case where a person wants to see an object in front of the person more than 35 degrees beyond the center of the eye, the person will actively turn the head of the person instead of laboriously rotating the eyeball of the person.

FIG. 4 shows a relationship between gaze point clarity and a gaze point angle; a diffuse spot in the central field of view is much smaller than one pixel; when the gaze point angle is 25 degrees, the diffuse spot of the image formed by the optical system provided by the present disclosure has a diameter of 22 microns, with higher clarity.

Figure 5:
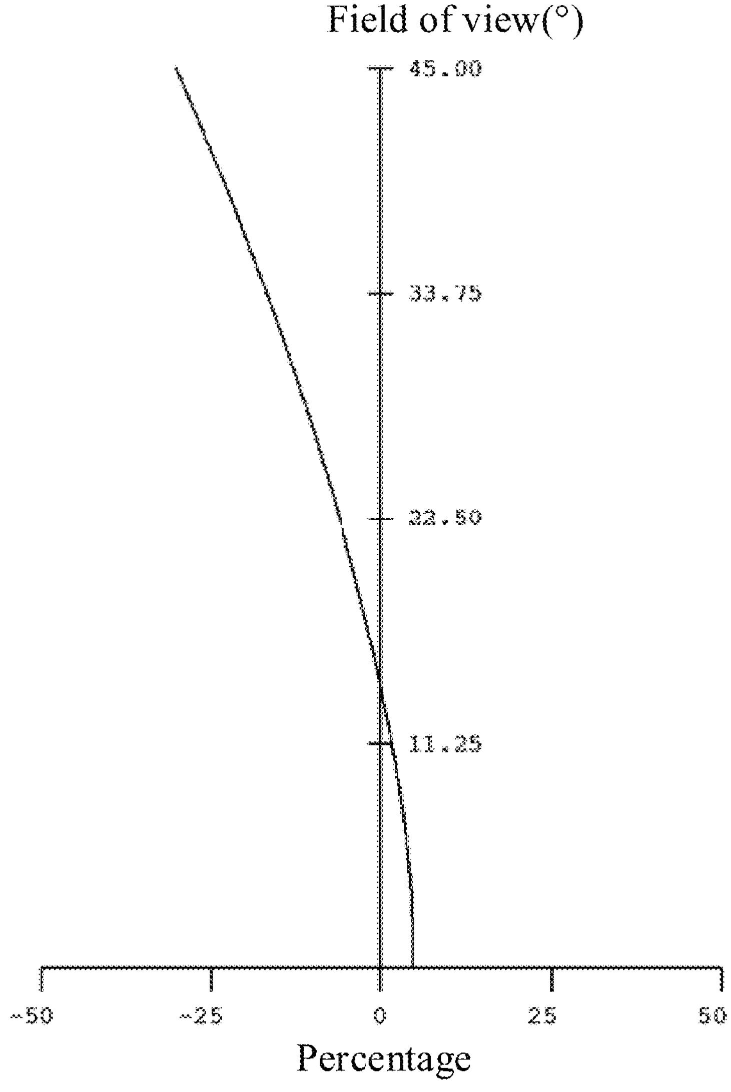
FIG. 5 shows a distortion diagram of the optical system shown in FIG. 1.

FIG. 5 shows a distortion diagram of the optical system shown in FIG. 1. For example, as shown in FIG. 5, distortion is a parameter in an optical system, and is one of the important factors limiting the accuracy of optical measurements, which indicates the degree of distortion of an object image formed by the optical system relative to the object. FIG. 5 shows the degree of distortion in the optical system. At a 45° half field of view, the relative distortion of the optical system is no less than −35%, thus, the optical system meets distortion requirements for imaging in general virtual reality products, and the degree of distortion is relatively low. Additionally, distortion correction may be preprocessed in software.

Figure 6:
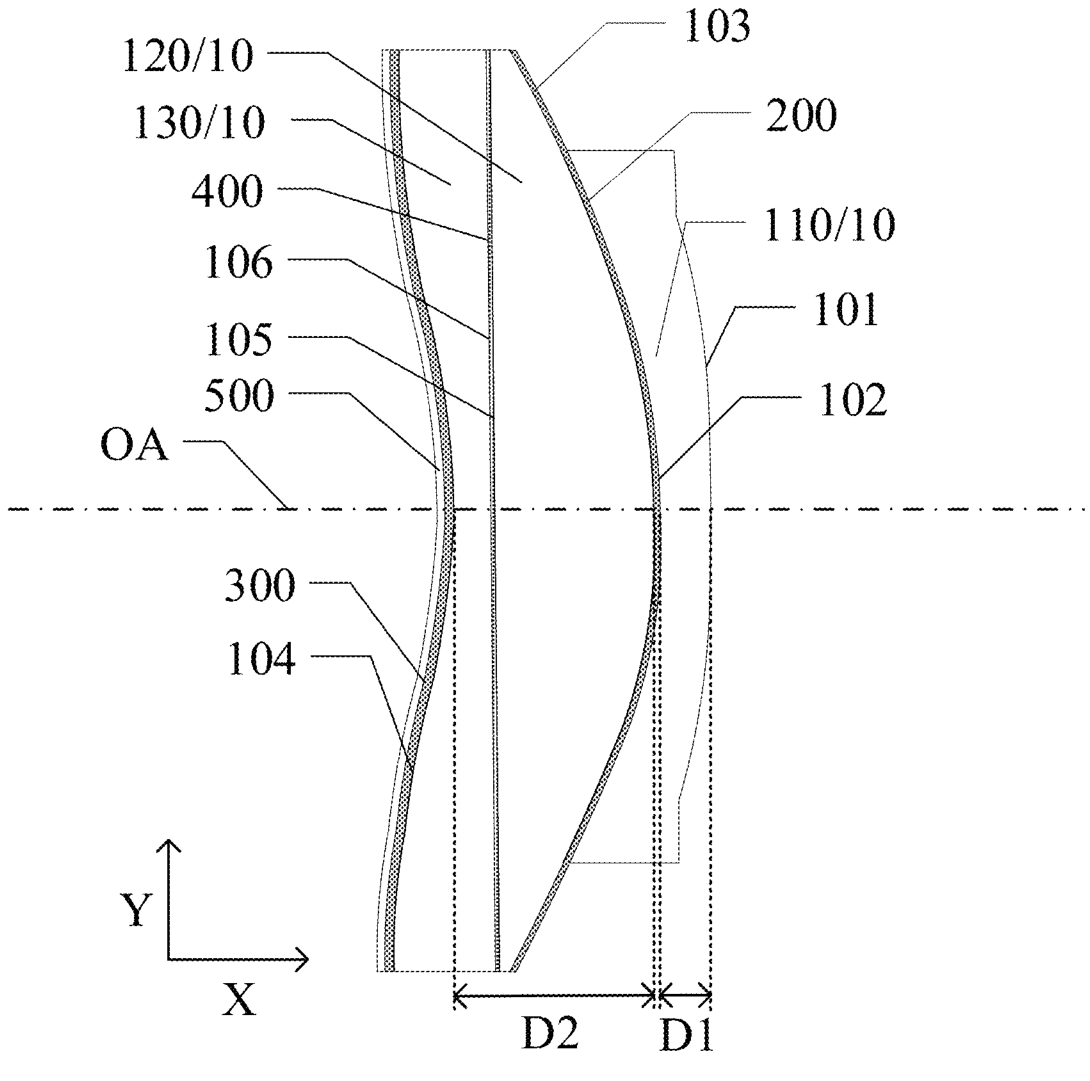
FIG. 6 and FIG. 7 are cross-sectional views of optical systems provided by different examples according to an embodiment of the present disclosure.

FIG. 6 is a cross-sectional view of an optical system provided by another example according to the embodiment of the present disclosure. The optical system shown in FIG. 6 differs from the optical system shown in FIG. 1 in that the aperture of the first lens 110 is different. For example, the aperture of the first lens 110 may be adjusted as long as it is larger than the effective clear aperture of the optical system.

Figure 7:
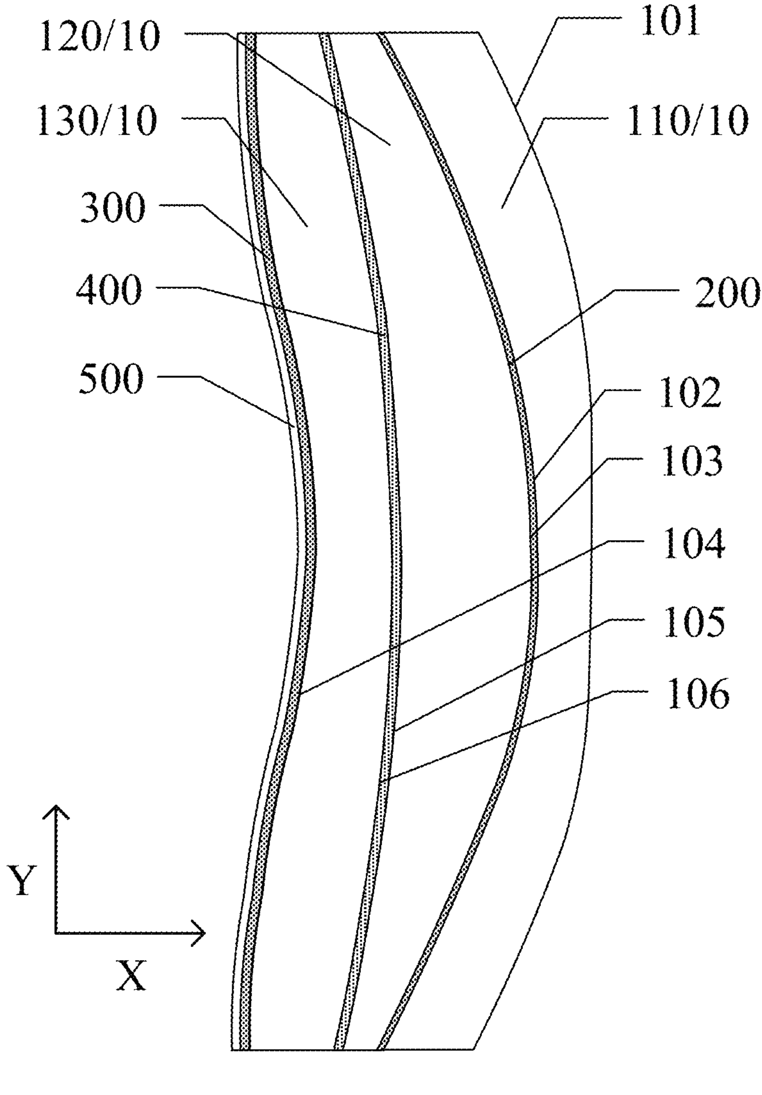

FIG. 7 is a cross-sectional view of an optical system provided by another example according to the embodiment of the present disclosure. The optical system shown in FIG. 7 differs from the optical system shown in FIG. 1 in that the fifth surface and the sixth surface have different surface types.

In some examples, as shown in FIG. 7, the fifth surface 105 and the sixth surface 106 have a same surface type parameter, and an absolute value of the curvature radius of the fifth surface 105 in at least one direction is greater than an absolute value of the curvature radius of other surfaces. For example, the fifth surface 105 and the sixth surface 106 both bend towards a side close to the first surface 101. For example, without considering the film layer provided between the fifth surface and the sixth surface, the fifth surface may almost completely be attached to the sixth surface.

In some examples, as shown in FIG. 7, the absolute values of the curvature radii in the at least one direction of the fifth surface 105 and the sixth surface 106 are no less than 100 millimeters. For example, the absolute values of the curvature radii in any direction of the fifth surface 105 and the sixth surface 106 are no less than 100 millimeters. For example, the fifth surface 105 and the sixth surface 106 may be micro-curvature surfaces.

For example, as shown in FIG. 7, the ratios of the curvature radii of the fifth surface 105 and the sixth surface 106 to the focal length of the optical system are −8 to −10.

For example, as shown in FIG. 7, when the fifth surface 105 (or the sixth surface 106) used for arranging the phase retardation film 400 in the lens component 10 is a curved surface, in the process of attaching the phase retardation film 400 to the lens component 100, the flat-shaped phase retardation film 400 firstly needs to be stretched appropriately, and then completely attached to the curved fifth surface 105. In the case where the curvature radius of the fifth surface 105 of the lens component 10 is relatively small, for example, when the absolute value thereof is less than 100 millimeters and meanwhile the conic constant is greater than or equal to zero, the phase retardation film 400 may produce wrinkles when stretched and attached to the fifth surface 105; the wrinkles produced by excessively stretching and attaching the phase retardation film 400 may affect accuracy of phase delay of the phase retardation film, and further affect optical performance. In the optical system provided by the present disclosure, by setting the absolute value of the curvature radius of the fifth surface for attaching the phase retardation film greater, impact of the curved surface type of the fifth surface on the performance of the phase retardation film may be reduced.

Figure 8:
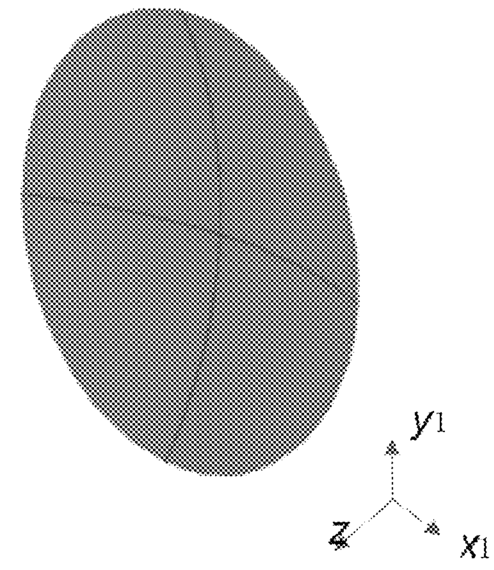
FIG. 8 and FIG. 9 are schematic diagrams of different shapes of a fifth surface shown in FIG. 7.
Figure 9:
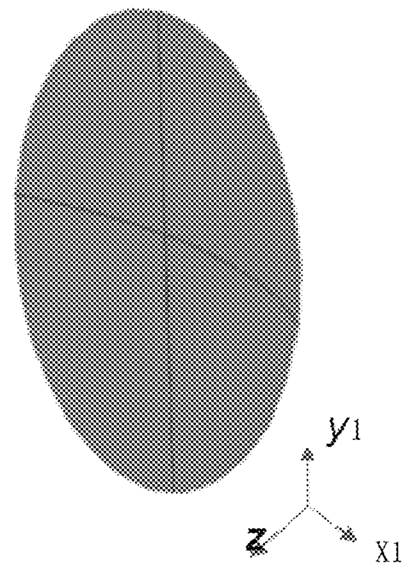

FIG. 8 and FIG. 9 are schematic diagrams of different shapes of the fifth surface shown in FIG. 7.

For example, as shown in FIG. 7 and FIG. 8, the fifth surface 105 may be a curved surface having a rotational symmetry characteristic. For example, the fifth surface 105 has surface types in the X1 direction and the Y1 direction consistent with each other, and the fifth surface has a curvature radius Rx in the X1 direction equal to a curvature radius Ry in the Y1 direction, for example, both are less than −100 micrometers. For example, the fifth surface 105 may be an aspherical surface.

For example, as shown in FIG. 7 and FIG. 9, the fifth surface 105 may be a curved surface having an axial symmetry characteristic. For example, the fifth surface 105 has a surface type in the X1 direction different from a surface type in the Y1 direction, and the fifth surface has a curvature radius Rx in the X1 direction different from a curvature radius Ry in the Y1 direction, for example, one of the curvature radius Rx and the curvature radius Ry is less than −100 micrometers. For example, the fifth surface 105 may be an ellipsoidal surface. For example, the fifth surface 105 may be a cylindrical surface, that is, the fifth surface 105 is a curved surface in one of the X1 direction and the Y1 direction, while the fifth surface 105 is a flat surface in the other direction, that is, the cylindrical surface, $Rx \neq 0$, $Ry=0$.

By setting the shape of the fifth surface to the shape shown in FIG. 8, it is favorable for avoiding significant impact on the shape of the phase retardation film during the process of stretching and attaching the phase retardation film.

In some examples, as shown in FIG. 7, a ratio of a center thickness to an edge thickness of the second lens 120 is greater than or equal to 0.5 and no greater than 3, and a ratio of an edge thickness to a center thickness of the third lens 130 is greater than or equal to 0.5 and no greater than 2. By reasonably setting the ratio of the center thickness to the edge thickness for different lenses, it is favorable for ensuring injection molding of different lenses, for example, the second lens and the third lens, reducing stress and making processing easier.

For example, as shown in FIG. 7, the ratio of the center thickness to the edge thickness of the second lens 120 is no greater than 2.8, and the ratio of the edge thickness to the center thickness of the third lens 130 is no greater than 1.5. For example, the ratio of the center thickness to the edge thickness of the second lens 120 is no greater than 2.5, and the ratio of the edge thickness to the center thickness of the third lens 130 is no greater than 1.7. For example, the ratio of the center thickness to the edge thickness of the second lens 120 is no greater than 2.3, and the ratio of the edge thickness to the center thickness of the third lens 130 is no greater than 1.4. For example, the ratio of the center thickness to the edge thickness of the second lens 120 is no greater than 2, and the ratio of the edge thickness to the center thickness of the third lens 130 is no greater than 1.2.

Figure 10:
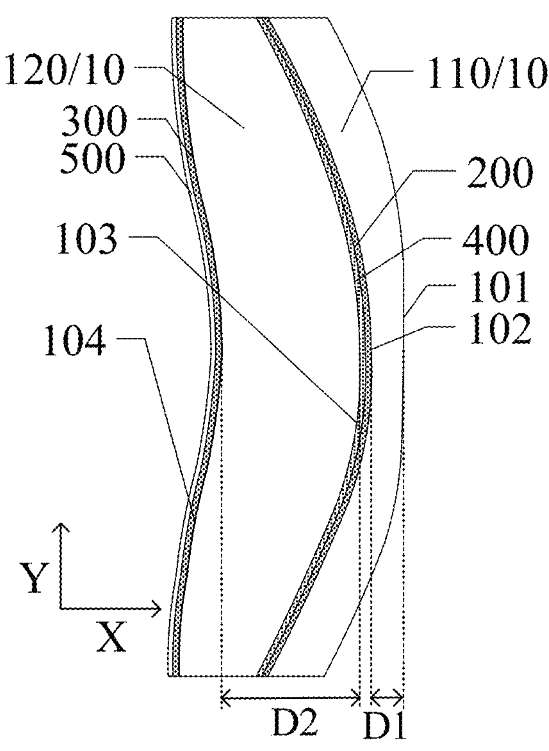
FIG. 10 to FIG. 12 are cross-sectional structural schematic diagrams of optical systems provided by different examples according to the embodiment of the present disclosure.

FIG. 10 is a cross-sectional structural schematic diagram of the optical system provided by another example according to the embodiment of the present disclosure. The optical system shown in FIG. 10 differs from the optical system shown in FIG. 1 in that the number of lenses included in the lens component 10 is different, and the position of the phase retardation film 400 is different.

In some examples, as shown in FIG. 10, the lens component 10 includes a first lens 110 and a second lens 120 arranged sequentially along an direction of the optical axis; the first lens 110 includes the first surface 101 and the second surface 102, and the second lens 120 includes the third surface 103 and the fourth surface 104. The first surface, the second surface, the third surface and the fourth surface in the example have the same features as the first surface, the second surface, the third surface and the fourth surface in the lens component provided by the above-described example, and no details will be repeated here.

Only the first lens and the second lens are provided in the lens component, which facilitates fabricating the lens component.

For example, as shown in FIG. 10, a center thickness of the first lens 110 is the first distance D1, and a center thickness of the second lens 120 may be the second distance D2. The first distance and the second distance in the example may have the same features as the first distance and the second distance in the above-described example, and no details will be repeated here.

For example, as shown in FIG. 10, the phase retardation film 400 is located between the transflective film 200 and the third surface 103. For example, the transflective film 200 may be plated on the second surface 102, the phase retardation film 400 may be attached to the third surface 103, and the first lens 110 is bonded to the second lens 120. The transflective film in the example has the same features as the transflective film in the above-described example, and no details will be repeated here.

For example, as shown in FIG. 10, the phase retardation film 400 may be made of liquid crystal polymer; the polymer may implement same performance as the traditional optical film materials such as a quarter wave plate (with a conventional thickness of about 50 μm) at a very thin film thickness (1 μm to 5 μm); because the thickness of the film is thin, it has a high degree of adaptability to different curved surfaces, and is easy to mold according to the curved surface. In addition, the liquid crystal polymer is a cross-linked system, with molecules connected by chemical bonds with high modulus; when subjected to tension after attaching, it has only elastic deformation, without intense effects such as molecular extension and rearrangement that affect optical anisotropy. Therefore, the phase retardation film made of liquid crystal polymer is adopted to be attached to a curved surface, resulting in less optical offset. The phase retardation film made of the above-described liquid crystal polymer may be attached to a surface with a less curvature radius absolute value, for example, less than 100 millimeters, so as to improve the degree of freedom of the curvature radius of the surface in the lens component, which is further favorable for improving the image quality of the optical system, for example, including indicators such as clarity, distortion, and chromatic dispersion, etc.

The reflective polarization layer and the linear polarization film in the optical system provided by the example may have the same features as the reflective polarization layer and the linear polarization film in the optical system provided by the above-described example, and no details will be repeated here.

Figure 11:
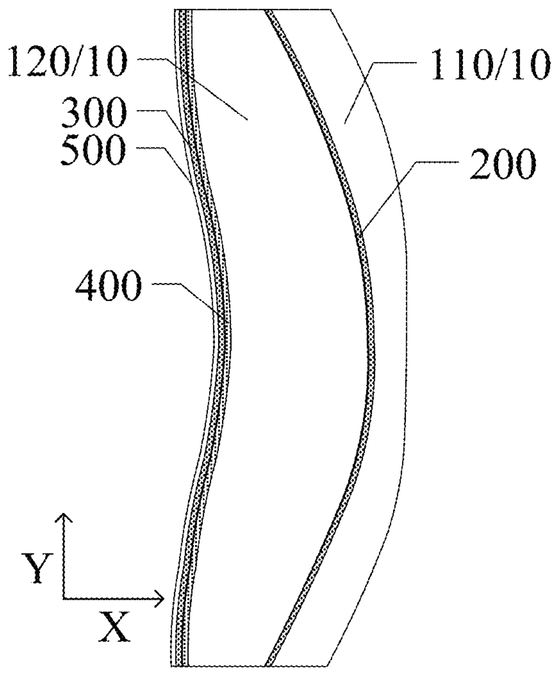

FIG. 11 is a cross-sectional structural schematic diagram of the optical system provided by another example according to the embodiment of the present disclosure. The optical system shown in FIG. 11 differs from the optical system shown in FIG. 10 in that the position of the phase retardation film 400 is different. For example, as shown in FIG. 11, the phase retardation film 400 is located between the reflective polarization layer 300 and the fourth surface 104.

In the optical systems in different examples shown in FIG. 1 to FIG. 11, the phase retardation film 400 is always located between the reflective polarization layer 300 and the transflective film 200; and the reflective polarization layer 300 in the respective examples shown in FIG. 1 to FIG. 11 may be made of the same material.

Figure 12:
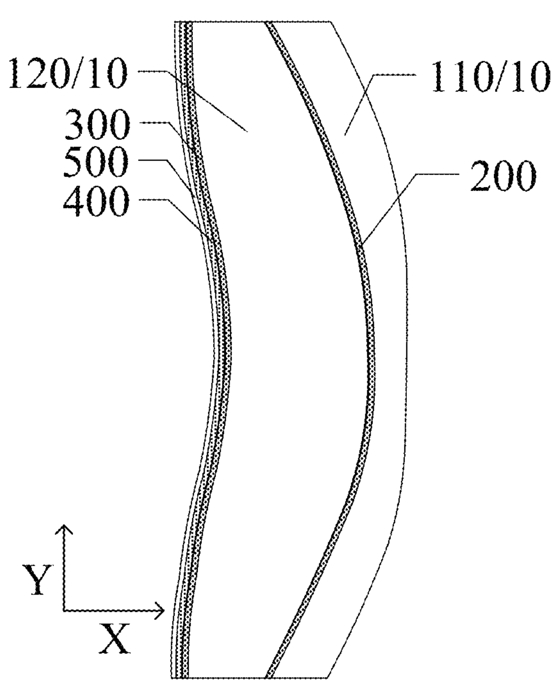

FIG. 12 is a cross-sectional structural schematic diagram of the optical system provided by another example according to the embodiment of the present disclosure. The optical system shown in FIG. 12 differs from the optical system shown in FIG. 11 in that the positional relationship between the phase retardation film 400 and the reflective polarization layer 300 is different, and the reflective polarization layers 300 in the optical system shown in FIG. 11 and the optical system shown in FIG. 12 have different characteristics.

In some examples, as shown in FIG. 12, the phase retardation film 400 is located on the side of the reflective polarization layer 300 that is away from the transflective film 200. For example, the phase retardation film 400 is located on the side of the reflective polarization layer 300 that is away from the fourth surface 104.

For example, as shown in FIG. 12, the reflective polarization layer 300 includes a cholesteric liquid crystal layer. The cholesteric liquid crystal layer may reflect circularly polarized light and transmit circularly polarized light. Referring to the folded optical path principle as mentioned above, the cholesteric liquid crystal layer 300 is provided between the phase retardation film 400 and the transflective film 200. The light emergent surface of the display screen located on a side of the first lens 110 that is away from the second lens 120 may be provided with a wave plate; image light emitted from the display screen is converted into right-handed circularly polarized light after passing through the wave plate; the right-handed circularly polarized light is incident on the transflective film 200; and the right-handed circularly polarized light keeps a polarized state unchanged after passing through the transflective film 200. The right-handed circularly polarized light is reflected back to the transflective film 200 after passing through the cholesteric liquid crystal layer 300, where a first reflection occurs; the right-handed circularly polarized light is reflected at the transflective film 200, where a second reflection occurs. Because of half wave loss, the reflected light changes from right-handed circularly polarized light to left-handed circularly polarized light; the left-handed circularly polarized light is transmitted by the cholesteric liquid crystal layer 300, then reaches the phase retardation film 400, and is converted into s-polarized light by the phase retardation film 400; then, the s-linearly polarized light is transmitted by the linear polarization film 500 and is exited towards the human eye.

Figure 13:
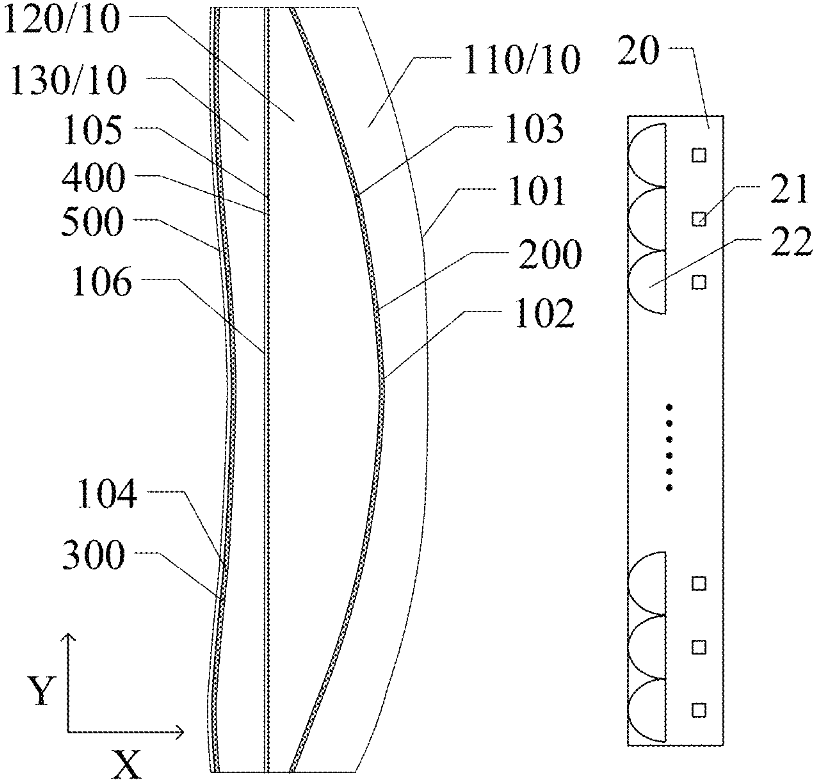
FIG. 13 is a partial structural schematic diagram of a display apparatus provided by another embodiment of the present disclosure.

FIG. 13 is a partial structural schematic diagram of a display apparatus provided by another embodiment of the present disclosure.

As shown in FIG. 13, the display apparatus includes a display screen 20 and an optical system in any one of the above-described examples. FIG. 13 schematically shows that the optical system is the optical system shown in FIG. 1, but it is not limited thereto; and the optical system may also be the optical system provided by any one of the examples in FIG. 6, FIG. 7, and FIG. 10 to FIG. 12.

As shown in FIG. 13, the optical system is located on a display side of the display screen 20; and the second surface 102 is located on a side of the first surface 101 that is away from the display screen 20.

For example, as shown in FIG. 13, a display surface of the display screen 20 is located on a focal plane of a light incident side of the optical system.

In some examples, as shown in FIG. 13, the display screen 20 includes a plurality of sub-pixels 21 and a microlens array 22 located on a light emergent side of the plurality of sub-pixels 21. For example, the microlens array 22 includes a plurality of microlenses, for example, the microlens may be a spherical lens or an aspherical lens. For example, the curvature radius of a surface of each microlens may be the same, but at least some microlenses may be eccentric microlenses, for example, having a convex surface vertex deviate from a center of a sub-pixel corresponding thereto; different microlenses have different included angles between optical axes thereof and a normal of a light emitting surface of the display screen, so that light emitted from the sub-pixel has light intensity redistributed after passing through the microlens, making maximum light intensity consistent with a chief ray direction of different fields of view in the optical system.

For example, as shown in FIG. 13, when the display screen has a relatively small size, in order to obtain a larger field of view and higher optical magnification, light emitted from an edge of the display screen needs to keep a larger inclination angle with the normal of the display screen surface; for example, a microlens array may be adopted to provide a user with the better viewing experience. For example, when the display screen has relatively large size and moderate field of view, the display screen may be provided with no microlens array therein.

For example, as shown in FIG. 13, the display screen 20 may be a silicon-based organic light emitting diode display screen with extremely high pixels per inch (PPI); the optical system has performance of high clarity and large field of view; the diffuse spot of the optical system in the central field of view is smaller than a size of one sub-pixel (at a micrometer level), and the full field of view may exceed 100 degrees.

For example, as shown in FIG. 13, the display screen 20 may be other types of display screen, for example, a liquid crystal display screen, an inorganic light emitting diode display screen, a quantum dot display screen, a projector (e.g., an LCOS mini projector), etc.

For example, the display apparatus may be a virtual reality (VR) display apparatus. For example, the virtual reality display apparatus may be a display apparatus that adopts ultra-short focus folded optical path.

For example, the display apparatus may be a near-eye display apparatus, the near-eye display apparatus may be a wearable VR helmet, VR glasses, etc.; and the embodiment of the present disclosure is not limited thereto.

The following statements should be noted:

(1) In the accompanying drawings of the embodiments of the present disclosure, the drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

The invention claimed is:

1. An optical system, comprising:

a lens component, comprising at least two lenses, the at least two lenses comprising a first surface, a second surface, a third surface and a fourth surface arranged sequentially along a direction of an optical axis of the lens component, and the second surface and the third surface having a same surface type parameter;

a transflective film, located between the second surface and the third surface of the lens component;

a reflective polarization layer, located on a side of the fourth surface of the lens component that is away from the first surface of the lens component; and a phase retardation film, located on a side of the transflective film that is away from the first surface;

wherein light transmitted through the transflective film and then incident on the lens component is configured to be folded back between the transflective film and the reflective polarization layer, and exit from the reflective polarization layer;

the first surface and the second surface are two surfaces of a same lens, the first surface is a convex surface, the second surface is a concave surface, the third surface is a convex surface, the fourth surface is a concave surface; an absolute value of a curvature radius of the fourth surface is greater than an absolute value of a curvature radius of the first surface, a ratio of a curvature radius of the third surface to the curvature radius of the fourth surface is 0.3 to 0.8, and an absolute value ratio of a conic constant of the third surface to a conic constant of the fourth surface is no greater than 0.2.

2. The optical system according to claim 1, wherein a distance between two intersection points where the first surface and the second surface intersect with the optical axis is a first distance, a distance between two intersection points where the third surface and the fourth surface intersect with the optical axis is a second distance; the first distance is less than the second distance, and a ratio of the second distance to a focal length of the optical system is 0.45 to 0.7.

3. The optical system according to claim 1, wherein a ratio of the curvature radius of the first surface to a focal length of the optical system is −1.5 to −2.5, and the conic constant of the first surface is close to negative infinity, or the curvature radius of the first surface is a negative value infinitely close to zero, and the conic constant of the first surface is −15 to −25;

a ratio of the curvature radius of the second surface to the focal length of the optical system and a ratio of the curvature radius of the third surface to the focal length of the optical system are both −1.75 to −2.5, and the conic constant of the second surface and the conic constant of the third surface are both −10 to 10;

a ratio of the curvature radius of the fourth surface to the focal length is −3.5 to −5, and the conic constant of the fourth surface is −100 to −50.

4. The optical system according to claim 2, wherein a ratio of the first distance to the focal length of the optical system is 0.15 to 0.25.

5. The optical system according to claim 1, wherein a ratio of an aperture of the lens component to the focal length of the optical system is 2 to 3.

6. The optical system according to claim 1, wherein a ratio of a total track length of the optical system to the focal length of the optical system is 0.8 to 1.

7. The optical system according to claim 1, wherein the phase retardation film is located between the reflective polarization layer and the transflective film, or located on a side of the reflective polarization layer that is away from the transflective film.

8. The optical system according to claim 1, further comprising:

a linear polarization film, located on a side of the reflective polarization layer that is away from the transflective film.

9. The optical system according to claim 2, wherein the lens component comprises a first lens, a second lens and a third lens arranged sequentially along the direction of the optical axis; the first lens comprises the first surface and the second surface, the second lens comprises the third surface, the third lens comprises the fourth surface, the second lens further comprises a fifth surface opposite to the third surface, the third lens further comprises a sixth surface located on a side of the fourth surface that is close to the fifth surface; the fifth surface and the sixth surface are both flat surfaces; or the fifth surface and the sixth surface have a same surface type, and an absolute value of a curvature radius in at least one direction of the fifth surface is greater than an absolute value of a curvature radius of other surfaces;

the phase retardation film is located on the fifth surface or the sixth surface.

10. The optical system according to claim 9, wherein the absolute value of the curvature radius in the at least one direction of the fifth surface is greater than 100 millimeters.

11. The optical system according to claim 9, wherein a distance between two intersection points where two surfaces of the first lens intersect with the optical axis is the first distance, a distance between two intersection points where two surfaces of the second lens intersect with the optical axis is a third distance, a distance between two intersection points where two surfaces of the third lens intersect with the optical axis is a fourth distance; and the first distance and the fourth distance are both less than the third distance.

12. The optical system according to claim 11, wherein a ratio of a sum of the third distance and the fourth distance to the second distance is 0.9 to 1.1.

13. The optical system according to claim 11, wherein a ratio of the third distance to the focal length is 0.3 to 0.45, and a ratio of the fourth distance to the focal length is 0.15 to 0.25.

14. The optical system according to claim 10, wherein a ratio of a center thickness to an edge thickness of the second lens is greater than or equal to 0.5 and no greater than 3, and a ratio of an edge thickness to a center thickness of the third lens is greater than or equal to 0.5 and no greater than 2.

15. The optical system according to claim 1, wherein an exit pupil distance of the optical system is 12 millimeters to 20 millimeters.

16. The optical system according to claim 9, wherein the second lens and the third lens are made of a same material, and a material of the first lens is different from the material of the second lens.

17. The optical system according to claim 1, wherein the lens component comprises a first lens and a second lens arranged sequentially along the direction of the optical axis, the first lens comprises the first surface and the second surface, and the second lens comprises the third surface and the fourth surface;

the phase retardation film is located between the reflective polarization layer and the transflective film, or located on a side of the reflective polarization layer that is away from the fourth surface.

18. The optical system according to claim 17, wherein the phase retardation film is located between the reflective polarization layer and the transflective film, and the reflective polarization layer is configured to reflect linearly polarized light of one characteristic and transmit linearly polarized light of another characteristic; or, the phase retardation film is located on a side of the reflective polarization layer that is away from the fourth surface, and the reflective polarization layer comprises a cholesteric liquid crystal layer.

19. A display apparatus, comprising a display screen and the optical system according to claim 1, wherein the optical system is located on a display side of the display screen, and the second surface is located on a side of the first surface that is away from the display screen.

20. The display apparatus according to claim 19, wherein the display screen comprises a plurality of sub-pixels and a microlens array located on a light emergent side of the plurality of sub-pixels.

* * * * *